Sept. 18, 1934.                J. C. HYLANDER                    1,973,900
                         TRAFFIC POSITION INDICATING MODEL
                            Filed Feb. 7, 1934        4 Sheets-Sheet 1

Inventor
John C. Hylander
By *Clarence A. O'Brien*
Attorney

Sept. 18, 1934.   J. C. HYLANDER   1,973,900
TRAFFIC POSITION INDICATING MODEL
Filed Feb. 7, 1934    4 Sheets-Sheet 2
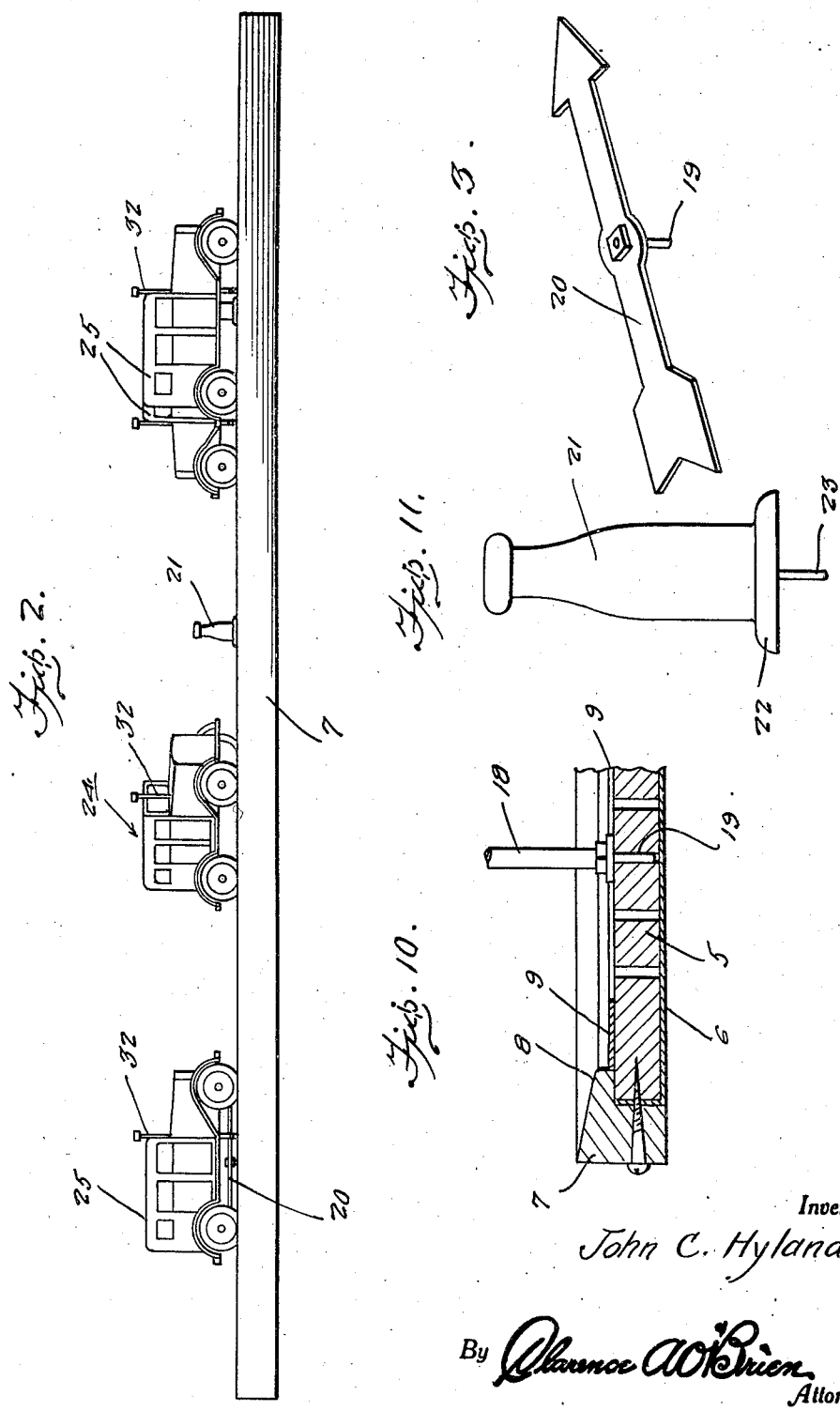
Inventor
John C. Hylander
By Clarence A. O'Brien
Attorney

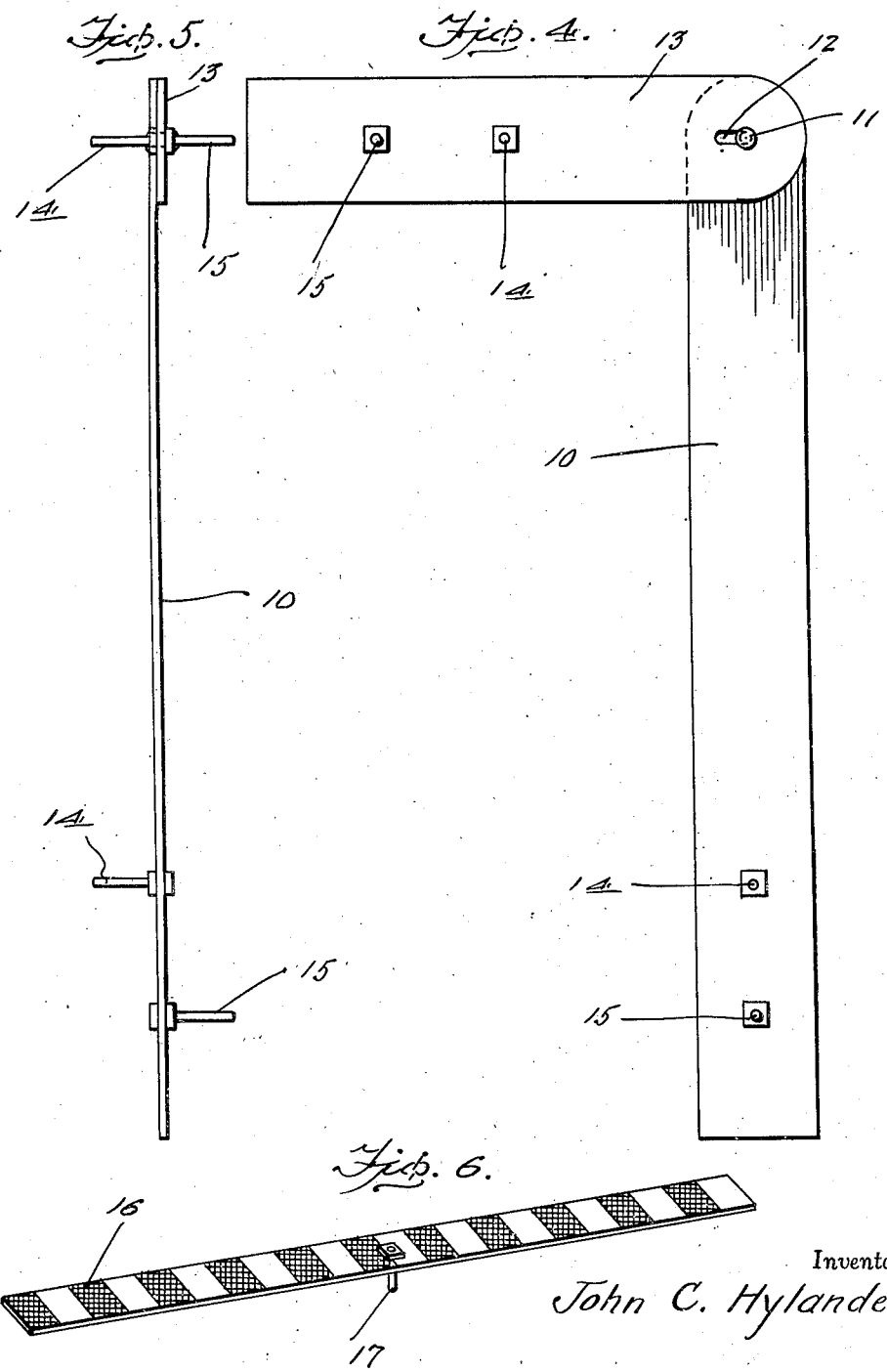

Sept. 18, 1934. J. C. HYLANDER 1,973,900
TRAFFIC POSITION INDICATING MODEL
Filed Feb. 7, 1934 4 Sheets-Sheet 4
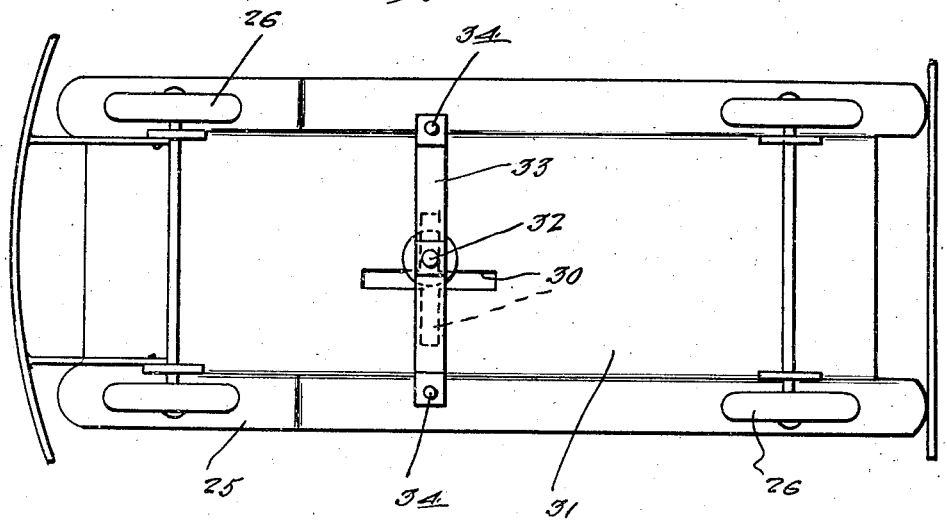
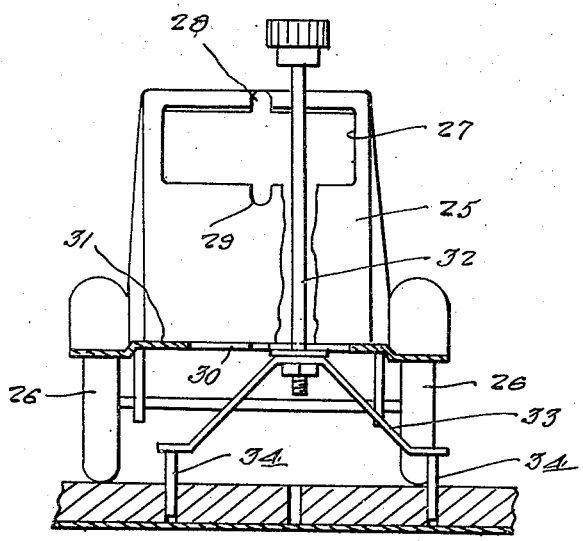
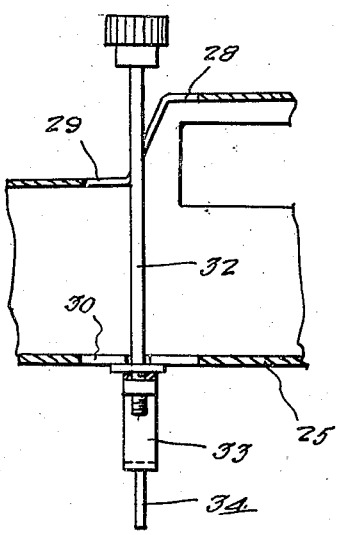
Inventor
John C. Hylander
By Clarence A. O'Brien
Attorney Patented Sept. 18, 1934

1,973,900

UNITED STATES PATENT OFFICE 1,973,900

TRAFFIC POSITION-INDICATING MODEL

John C. Hylander, Springfield, Mass., assignor of one-half to George B. Park, Springfield, Mass.

Application February 7, 1934, Serial No. 710,165

1 Claim. (Cl. 35—16)

This invention appertains to new and useful improvements in models, and more particularly to a model including miniature vehicles and traffic markers whereby the exact location and conditions of an accident can be illustrated in courts and other assemblies of inquiry or for the purpose of lectures.

The principal object of the present invention is to provide a traffic location-indicating model wherein the traffic elements can be positioned in the exact geometrical relation as existed on the street where the accident occurred, when the model is being employed for such purpose.

Another important object of the present invention is to provide a model for the purpose specified wherein the parts are capable of ready manipulation.

Other important objects and advantages of the invention will become apparent to the reader of the following specification.

In the drawings:—

Figure 2 represents a side elevational view of the board, with certain traffic elements thereon.

Figure 3 represents a perspective view of the accident pointer.

Figure 4 represents a plan view of one of the pavement markers.

Figure 5 represents an edge elevational view of one of the pavement markers.

Figure 6 represents a perspective view of one of the crosswalk markers.

Figure 7 represents a bottom plan view of one of the miniature automobiles.

Figure 8 represents a vertical sectional view taken substantially on line 8—8 of Figure 1.

Figure 9 represents a sectional view taken substantially on line 9—9 of Figure 1.

Figure 10 represents a sectional view taken substantially on line 10—10 of Figure 1.

Figure 11 represents a side elevational view of an element which is to represent a dummy policeman.

Figure 1:
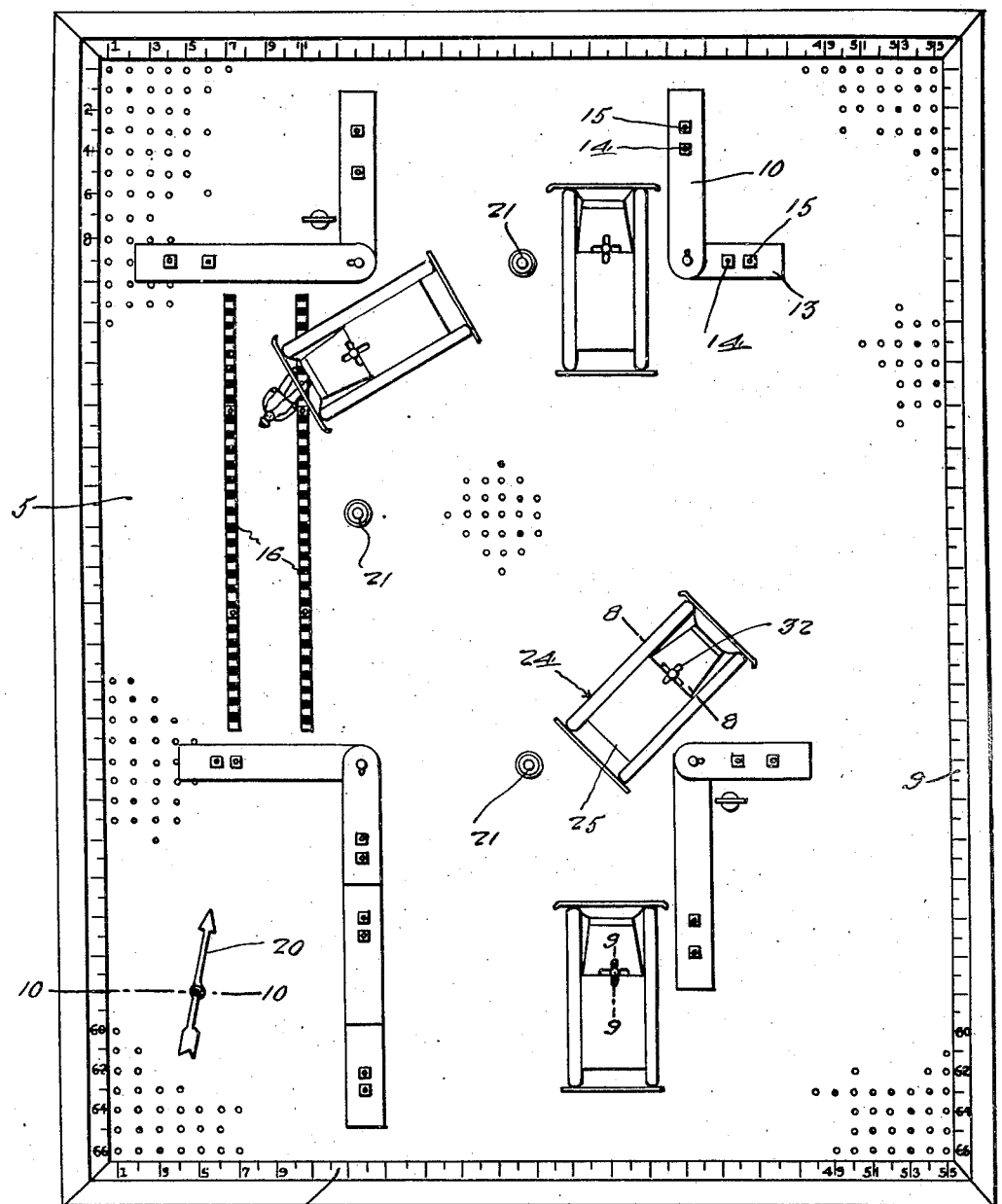
Figure 1 represents a top plan view of the board, with the traffic elements positioned thereon.

In the drawings wherein like numerals designate like parts, it can be seen that numeral 5 represents a rectangular shaped board, which may be of any desired dimensions, but which is to be laid off preferably in rows of openings running longitudinally and transversely of the board and of a definite spaced relation. In other words, a half-inch or inch space between the openings may represent a foot or a yard of the street or intersection.

This board has a felt or leather bottom covering 6, the edge portions of which are disposed upwardly and between the edges of the board 5 and the frame 7 in which the board is mounted. The frame 7 has an overlapping portion 8 and disposed on the board and around the entire perimeter thereof is the ruler or scale sections 9 which are shown in Figure 10 abutting the overlapping portion 8 of the frame. Each of these side and end strips 9 is numbered from 1 to a higher number at its opposite end by consecutive numerals, the numerals each being adjacent one opening or serving to represent a predetermined number of openings.

The pavement markers consist each of an assembly, such as is shown in Figures 4 and 5, the assembly consisting of an elongated strip 10 having a pin 11 in one end extending through a longitudinally extending slot 12 in the adjacent end of the shorter section 13. The section 13 has a pin 14 disposed in one direction, that is, away from one side of the section 13 and a pin 15 disposed away from the opposite side of the section and like pins 14—15 are provided on the section 10. These pins engage into the openings referred to and obviously by adjusting these sections to the proper angular relation, the pavement markers can be made up to define intersections of any number of street crossings which may be required in the case of intersecting avenues.

Numeral 16 represents a crosswalk marker and is in the form of an elongated strip having a pin 17 depending therefrom and having its top surface preferably laid off in black and white areas. Any number of these markers 16 can be employed to form a crosswalk between the pavement markers, as shown in Figure 1.

A post 18 provided with a pin 19 at its lower end for engagement into one of the aforementioned openings, supports a rotatable pointer 20 at its upper end and this can be used for indicating the location of the accident, as shown in Figure 1.

Numeral 21 represents a block of some suitable structure simulating a policeman and this is provided with a base 22 from which depends a pin 23 for engagement into one of the openings. These members 21 may not only represent policemen, but also pedestrians who may be serving as witnesses, as when the model is being employed in court and in other traffic inquiries.

Numeral 24 generally refers to a dummy automobile which consists of a body 25 having windows and suitable markings simulating doors and other fixtures and which is provided with wheels 26 which, of course, need not be mobile.

Where the usual windshield of a regular automobile is located, the model is provided with an opening 27, the body 25 at the upper edge of this opening being provided with a rearwardly extending slot 28 and the edge at the lower portion of the opening being provided with a forwardly extending slot 29. Numeral 30 represents crossed slots in the bottom portion 31 of the body 5, while extending upwardly through the slots 30 and through the opening 27 is the rod 32 which is secured at its lower end to the inverted V-shaped member 33 having pins 34—34 depending from their lower ends for engagement into the openings of the board 6. The nut 32ª on the lower end of the rod 32 serves to clamp the upper portion of the member 33 against the abutment 32ᵇ on the rod 32. A knob 32ᶜ on the upper end of the rod 32 permits easy operation of the rod 32.

The opening 27, as well as the slots 28—29 and 30, are provided so that after the model automobile has been approximately positioned on the board, the body 25 can be shifted about on the rod 32 to obtain minute adjustments of the portions of the body with respect to the openings of the board.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In a traffic position-marking model, a board having openings therein, a miniature vehicle, a support for the vehicle provided with a projection for engagement into an opening of the board, said miniature vehicle consisting of a body having crossed slots therein, said support including a post disposed vertically through the said slots, said body being shiftable on the said post to afford adjustment of the body with respect to the openings in the board.

JOHN C. HYLANDER.